United States Patent
Baughman et al.

(10) Patent No.: US 10,572,806 B2
(45) Date of Patent: Feb. 25, 2020

(54) QUESTION ANSWERING WITH TIME-BASED WEIGHTING

(71) Applicant: International Business Machines Corporation, Armonk, NY (US)

(72) Inventors: Aaron K. Baughman, Silver Spring, MD (US); Gary F. Diamanti, Wake Forest, NC (US); Mauro Marzorati, Lutz, FL (US); Elizabeth M. Valletti, Palm Harbor, FL (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 14/624,030

(22) Filed: Feb. 17, 2015

(65) Prior Publication Data

US 2016/0239740 A1 Aug. 18, 2016

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC .............................. G06N 5/04; G06N 99/005
See application file for complete search history.

(56) References Cited

U.S. PATENT DOCUMENTS

| | | | |
|---|---|---|---|
| 2005/0108212 A1* | 5/2005 | Karimisetty | ...... G06F 17/30525 |
| 2009/0287678 A1 | 11/2009 | Brown et al. | |
| 2010/0198880 A1* | 8/2010 | Petersen | ................ H04H 20/57 |
| | | | 707/803 |
| 2011/0066587 A1 | 3/2011 | Ferrucci et al. | |
| 2011/0125734 A1 | 5/2011 | Duboue et al. | |
| 2012/0215523 A1 | 8/2012 | Inagaki | |
| 2013/0007055 A1 | 1/2013 | Brown et al. | |
| 2013/0007262 A1* | 1/2013 | Akatoki | ................. H04L 43/04 |
| | | | 709/224 |

(Continued)

OTHER PUBLICATIONS

Tellex, Stefanie, et al. "Quantitative evaluation of passage retrieval algorithms for question answering." Proceedings of the 26th annual international ACM SIGIR conference on Research and development in informaion retrieval. ACM, 2003.*

(Continued)

*Primary Examiner* — Scott A. Waldron
*Assistant Examiner* — Kevin W Figueroa
(74) *Attorney, Agent, or Firm* — Stephen R. Tkas; Stephen J. Walder, Jr.; Diana R. Gerhardt

(57) ABSTRACT

A mechanism is provided in a data processing system for question answering using time weighted evidence. The mechanism receives an input question. The mechanism determines a time focus for the input question and defines a weighting function. The weighting function is a bell curve having a peak at the time focus on a time axis. The mechanism decomposes the input question into one or more queries and applies the one or more queries to a corpus of information to obtain a set of hypothesis evidence. Each item of information within the hypothesis evidence has an associated time value. The mechanism weights the set of hypothesis evidence based on the associated time values according to the weighting function to form time weighted evidence and generates hypotheses for answering the input question based on the time weighted evidence.

11 Claims, 8 Drawing Sheets

(56) References Cited

U.S. PATENT DOCUMENTS

| | | | |
|---|---|---|---|
| 2013/0018652 A1 | 1/2013 | Ferrucci et al. | |
| 2013/0066886 A1 | 3/2013 | Bagchi et al. | |
| 2013/0191185 A1* | 7/2013 | Galvin | G06Q 30/01 |
| | | | 705/7.37 |
| 2014/0304257 A1 | 10/2014 | Shahar et al. | |

OTHER PUBLICATIONS

Saquete, Estela, et al. "Splitting complex temporal questions for question answering systems." Proceedings of the 42nd Annual Meeting on Association for Computational Linguistics. Association for Computational Linguistics, 2004.*

List of IBM Patents or Patent Applications Treated as Related (Appendix P). 2 pages.

"Closure Problem", Wikipedia, http://en.wikipedia.org/wiki/Closure_problem, retrieved from the internet on Oct. 31, 2014, 5 pages.

Barandiaran, Xabier et al., "Defining Agency Individuality, Normativity, Asymmetry and Spatio-temporality in Action", Adaptive Behavior-Animals, Animats, Software Agents, Robots, Adaptive Systems, vol. 17, issue 5, Oct. 2009, 13 pages.

Bollig, Benedikt et al., "Pebble Weighted Automata and Weighted Logics", ACM Transactions on Computational Logic, vol. 15, No. 2, Article 15, Apr. 2014, 35 pages.

Cohen, Edith, "Estimating the Size of the Transitive Closure in Linear Time", Proceedings of the 35th Annual Symposium on Foundations of Computer Science, Nov. 20-22, 1994, 11 pages.

Cohen, Edith, "Polylog-Time and Near-Linear Work Approximation Scheme for Undirected Shortest Paths", Journal of the ACM, vol. 47, No. 1, Jan. 2000, 35 pages.

Guntheroyh, Warren G. , "In Vivo Measurement of Dimensions of Veins with Implications Regarding Control of Venous Return", IEEE Transactions on Bio-Medical Engineering, vol. BME-16, No. 4, Oct. 1969, pp. 247-253.

Gupta, Ankit et al.. "Random Arithmetic Formulas can be Reconstructed Efficiently", Computational Complexity, vol. 23 Issue 2, Jun. 2014, 56 pages.

High, Rob, "The Era of Cognitive Systems: An Inside Look at IBM Watson and How it Works", IBM Corporation, Redhooks, Dec. 12. 2012, 16 pages.

King, Valeri, "Fully Dynamic Algorithms for Maintaining All-Pairs Shortest Paths and Transitive Closure in Digraphs", The 40th Annual Symposium on Foundations of Computer Science (FOCS), Oct. 17-19, 1999, 9 pages.

Liu, Bin-Sheng et al., "A Combination Forecasting Model to Chaotic Time Series", Proceedings of the 2007 International Conference on Wavelet Analysis and Pattern Recognition, Beijing, China, Nov. 2-4, 2007, 6 pages.

Liu, Ying et al., "A Fast High Utility Itemsets Mining Algorithm", UBDM '05 Workshop on Utility-Based Data Mining, Aug. 21, 2005, 10 pages.

McCord, M.C. et al., "Deep parsing in Watson", IBM J. Res. & Dev. vol. 56 No. 3/4 Paper 3, May/Jul. 2012, pp. 3:1-3:15.

Sabry-Rizk, M. et al., "A New Class of Non-Linear , Multi-Dimensional Structures for Long-Term Dynamic Modelling of Chaotic Systems", 14th International Conference on Digital Signal Processing Proceedings (DSP 2002), Jul. 1-3, 2002, 4 pages.

Tseng, Wen-Hung et al., "Analysis of the Asia-Pacific TWSTFT Network", 2008 IEEE International Frequency Control Symposium, May 19-21, 2008, 6 pages.

Yuan, Michael J. , "Watson and healthcare, How natural language processing and semantic search could revolutionize clinical decision support", IBM developerWorks, IBM Corporation, Apr. 12, 2011, 14 pages.

* cited by examiner

QUESTION ANSWERING WITH TIME-BASED WEIGHTING

BACKGROUND

The present application relates generally to an improved data processing apparatus and method and more specifically to mechanisms for iterative deepening knowledge discovery using time-weighted closures based on dimensions of evidence.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana®, from Microsoft®, and the IBM Watson™ system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system, is provided for question answering using time weighted evidence. The method comprises receiving an input question. The method further comprises determining a time focus for the input question and defining a weighting function. The weighting function is a bell curve having a peak at the time focus on a time axis. The method further comprises decomposing the input question into one or more queries and applying the one or more queries to a corpus of information to obtain a set of hypothesis evidence. Each item of information within the hypothesis evidence has an associated time value. The method further comprises weighting the set of hypothesis evidence based on the associated time values according to the weighting function to form time weighted evidence and generating, by the data processing system, hypotheses for answering the input question based on the time weighted evidence.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
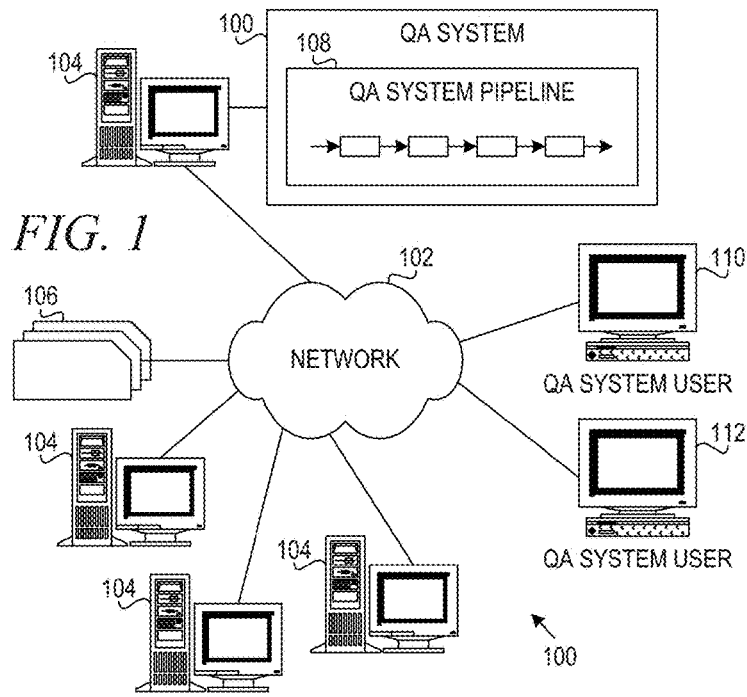
FIG. 1 depicts a schematic diagram of one illustrative embodiment of a question/answer creation (QA) system in a computer network.

The illustrative embodiments provide mechanisms for time-weighted closures based on dimensions of evidence.

Closure based paradigms enable a code block to access non-local variables from a function call. Closure is a paradigm whereby pointers to functions that have local variables are accessible beyond the local scope. As known in programming languages, a closure (also lexical closure or function closure) is a function or reference to a function together with a referencing environment—a table storing a reference to each of the non-local variables (also called free variables or upvalues) of that function. A closure, unlike a plain function pointer, enables a function to access those non-local variables even when invoked outside its immediate lexical scope.

In accordance with illustrative embodiments, within natural language processing systems such as question answering (QA) systems, an evidence retrieval and hypothesis generation stages access evidence and principle words from a context of a user's question. As a result, a QA system using the mechanisms of the illustrative embodiments has a natural iterative deepening discovery of both answers and questions. In the illustrative embodiments, the iterative deepening discover may be non-user-driven. For example, the QA system can recommend future questions and also show results that are tangentially related to a user's question.

When the user submits an initial question, the user interface generates a function call to the QA system including the user's question. In response, the QA system generates one or more candidate answers based on evidence retrieved from a corpus of information and returns the one or more candidate answers to the user interface. In accordance with the illustrative embodiment, the QA system may also generate one or more deepening questions based on the user's initial question and the evidence retrieved from the corpus. For each deepening question, the QA system generates a new function call, including the deepening question and a set of context evidence. In closure form, the function call includes the context evidence as an evidence container. Upon receiving the new function call, the QA system access the evidence in the evidence container as non-local evidence. Hypothesis evidence that the QA system retrieves from the corpus for answering the deepening question is considered local evidence in the closure paradigm.

In one embodiment, the evidence container may contain a plurality of dimensions of evidence. A dimension of evidence is grouping or taxonomy that the evidence follows. The QA system groups bins evidence supporting the hypotheses or candidate answers into one or more dimensions of evidence. For example, given a question about cancer treatment, the QA system may group the hypothesis evidence into a radiation treatment dimension and a chemotherapy dimension, each having its own timestamp.

Some dimensions of evidence may be highly accurate during specific time periods. For instance, a great deal of research for chemotherapy was done in the 1940s with major breakthroughs occurring in the mid-to-late 1960s. The early research between 1940 and 1965 is likely to be inaccurate or misleading. On the other hand, the user may want to focus on more modern chemotherapy treatments with reliable evidence in the late 1980s.

The illustrative embodiments provide mechanisms that allow the user to focus the evidence on particular time frames. In one embodiment, the user provides a time focus, and the mechanisms define a time-based weighting function. The time-based weighting function may be a square pulse, a parabola, or a bell curve. In one embodiment, the time-based weighting function is a Gaussian function. The QA system uses the time-based weighting function to weight hypothesis evidence, thus focusing the evidence on a particular time focus, which may be user-defined or determined based on machine learning techniques.

In one example embodiment, the QA system provides a user interface with controls for setting the time focus (vertex) and the width of the time-based weighting function. For example, using a focus control, the user sets the vertex of a Gaussian function, and using a width control, the user sets the standard deviation of the Gaussian function. In another embodiment, the user sets a time frame, and the QA system automatically defines the time-based weighting function to cover the time frame. In yet another embodiment, the QA system defines the time-based weighting function for the combination of dimensions of evidence based on a trained machine learning model.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
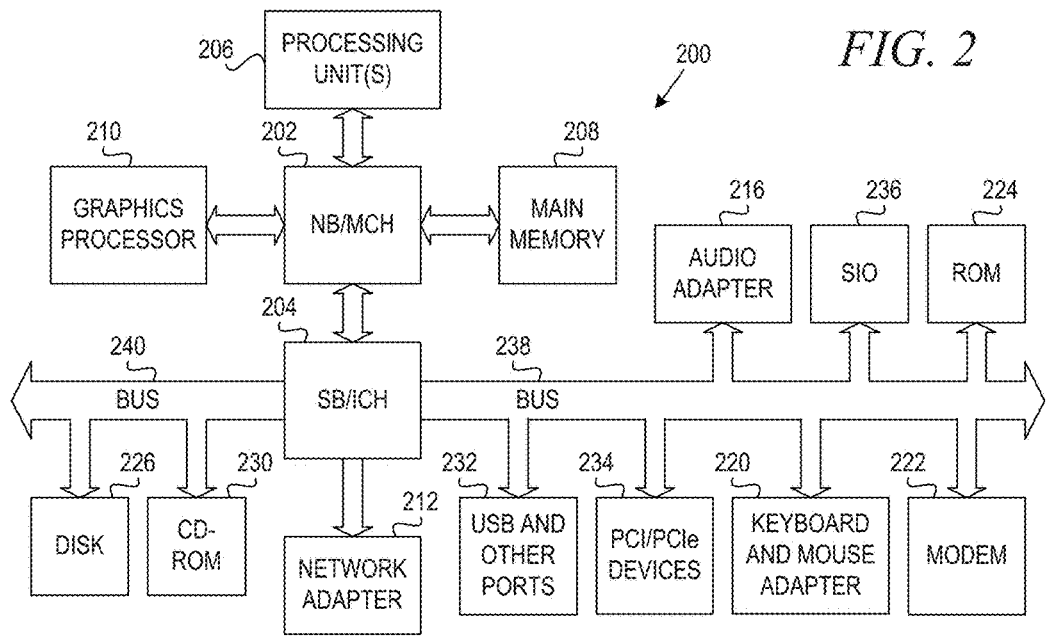
FIG. 2 is a block diagram of an example data processing system in which aspects of the illustrative embodiments are implemented.
Figure 3:
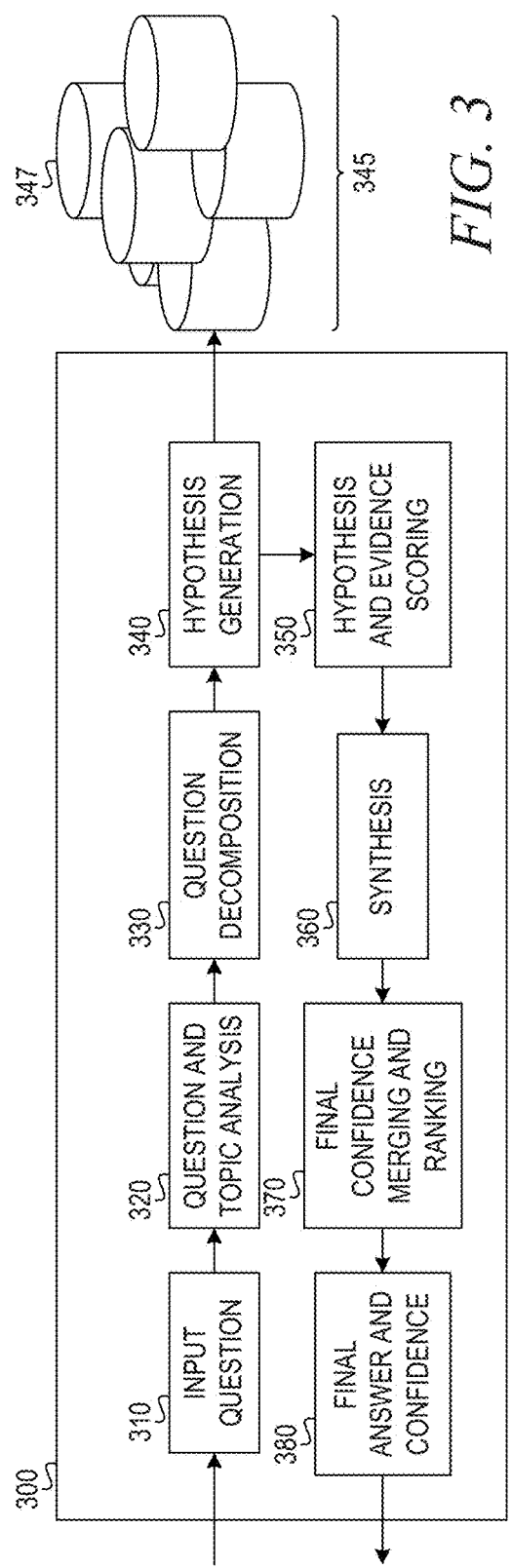
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to time-weighted closures based on dimensions of evidence.

Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. While the IBM Watson™ QA system is described herein as an example, the illustrative embodiments are not intended to be limited to the IBM Watson™ QA system. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with an illustrative embodiment, QA system users at clients 110, 112 submit questions to QA system 100, which decomposes each question into one or more queries and applies the queries to corpus 106 to receive evidence for forming one or more hypotheses. The hypothesis evidence is local with respect to the input question. QA system 100 generates one or more candidate answers based on the hypothesis to be presented to the QA system users 110, 112.

QA system 100 generates one or more questions to explore particular dimensions of evidence within the hypothesis evidence. QA system 100 then iteratively calls itself for each of the one or more generated questions and attaches a portion of the hypothesis evidence for context. QA system 100 may generate a plurality of deepening questions in parallel, providing iterative, deepening information discovery. The context evidence received with each new question is non-local with respect to the new question. QA system then decomposes each new question into queries and applies the queries to corpus 106 to receive hypothesis evidence, which is local to the new question. The QA system 100 generates one or more candidate answers and may also generate one or more new questions.

In accordance with another illustrative embodiment, QA system 100 performs time-based weighting of evidence. Each question submitted to QA system 100 may have an associated time focus. QA system 100 defines a time-based weighting function based on the time focus. QA system 100 then weights hypothesis evidence for the question based on the weighting function. The time-based weighting function may be a square pulse or bell curve, for example. Each dimension of evidence may have its own time focus; therefore, the time-based weighting function may be a multi-dimensional Gaussian function, for instance. Thus, QA system 100 may focus on the most accurate evidence or a time period of interest.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/ candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

Figure 4:
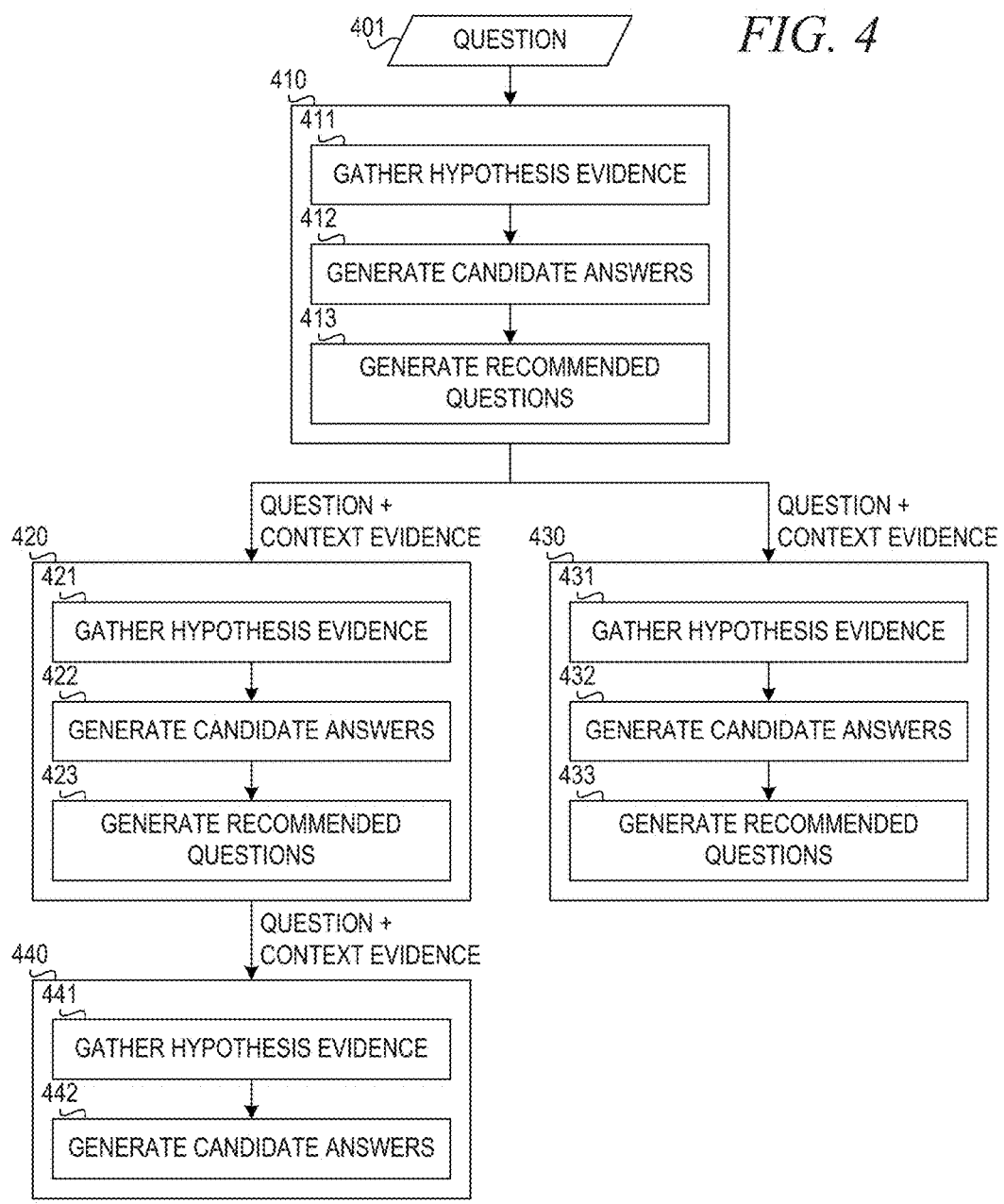
FIG. 4 is a block diagram illustrating iterative deepening knowledge discovery using closure-based question answering in accordance with an illustrative embodiment.

FIG. 4 is a block diagram illustrating iterative deepening knowledge discovery using closure-based question answering in accordance with an illustrative embodiment. Question answering system instance 410 receives question 401. In the illustrative embodiment, an instance of a QA system comprises the state of the QA system processing a given input question. Each time the QA system receives a function call for a new input question, the states of variables, features and supporting evidence loaded into memory, and the like make up a QA system instance. For example, a QA system may answer questions received from different users in different user sessions. Each user session is a separate instance of the QA system, and the QA system may switch between user sessions or QA system instances. In an alternative embodiment, a QA system instance may be an instance of a virtual machine running the QA system such that multiple instances of the QA system may execute with context switching or concurrently with parallelism. For the purposes of the discussion of the illustrative embodiments, a QA system instance is the processing of a function call for a given input question and its associated context within the QA system.

QA system instance 410 gathers hypothesis evidence (block 411) for input question 401. QA system instance 410 gathers hypothesis evidence in hypothesis generation stage 340 in FIG. 3, for example. The hypothesis evidence comprises annotated passages from the corpus of data. QA system instance 410 generates candidate answers (block 412) based on the hypothesis evidence. QA system instance 410 generates candidate answers in stages 340-370 in FIG. 3, for example.

In accordance with the illustrative embodiment, QA system instance 410 generates one or more recommended questions (block 413) for deepening information discovery. QA system instance 410 may generate questions based on the hypothesis evidence. In one embodiment, QA system instance 410 generates recommended questions by examining the hypothesis evidence to identify dimensions of evidence and find gaps in the passages of the hypothesis evidence. The QA system instance 410 then associates missing information with a Lexical Answer Type (LAT) and rephrases features from the passages into question form.

In one embodiment, the QA system uses slot filler templates to generate the deepening questions. An English Slot Grammar parser of the QA system parses each sentence of a supporting passage. Each slot has a specific part of speech and label. The QA system then inserts the parsed components into the slots of the slot filler templates to generate questions. The QA system can mix several parsed sentences together to fill different combinations of slots to form multiple questions.

Consider the Following Example:

Question: Who was Vasco da Gama?

Supporting passage: Vasco da Gama commanded a Portuguese ship. He sailed more than 6,000 miles over open ocean.

Deepening questions: When did Vasco da Gama sail a Portuguese ship over 6,000 miles of open ocean? In which ocean did Vasco da Gama sail a Portuguese ship? What ship did Vasco da Gama command?

In the above example, the parser of the QA system parses the supporting passages to identify "Vasco da Gama" as a proper noun labeled as a person, "commanded" as a verb, "6,000" as a number, and so forth. Consider the following an example slot filler template: "Which <noun> did <person> <verb>?" Given the components parsed from the example supporting passage, the QA system may generate the following question: "Which ship did Vasco da Gama command?" Other known techniques for generating questions may also be used in the illustrative embodiments.

In one embodiment, the QA system applies a justifying passage model to evidence passages in order to filter the evidence passages during candidate answer generation in accordance with one illustrative embodiment. In this illustrative embodiment, the QA system uses the justifying passage model (JPM) with a QA system in which a large number of evidence passages from the corpus are returned for evaluation in order to provide as much recall as possible, where "recall" refers to how many correct items were identified correctly by the system (i.e., using a ground truth table, recall refers to the ratio of true positives (tp) to the sum of true positives and false negatives (fn), the ratio being tp/(tp+fn). In this embodiment, the QA system uses the JPM to generate relevance scores for the evidence passages and filter the large number of evidence passages based on their relevance scores and predetermined filter criteria, to generate a smaller set of evidence passages that provides for maximum recall while reducing the amount of evidence passages that are submitted to the QA system pipeline for further processing, e.g., hypothesis generation stage processing, hypothesis and evidence scoring stage processing, or any of the other further downstream processing of the QA system pipeline. In this way, runtime performance of the QA system pipeline is improved by reducing the number of evidence passages needing to be processed but doing so in such a way as to maximize the recall, i.e. utilizing the more justifying evidence passages, and hence relatively more relevant evidence passages, from the larger set of evidence passages and filtering out the less justifying evidence passages, and hence relatively less relevant evidence passages, from the set of evidence passages considered during further QA system pipeline processing.

Thus, in one embodiment, the QA system uses the JPM to identify the top N justifying evidence passages to be included as context evidence for a given deepening question, where N is a predetermined value. In another embodiment, the QA system selects context evidence based the supporting passages used to form a given deepening question. The QA system may use a combination of the above or other techniques that will become apparent to a person of ordinary skill in the art to select context evidence to pass with a function call for a given deepening question.

In the example depicted in FIG. 4, QA system instance 410 generates two deepening questions and attaches a subset of the hypothesis evidence to each question. QA system instance 410 calls the QA system for each deepening question to create QA system instances 420, 430. QA system instance 420 receives a first deepening question and associated context evidence. QA system instance 420 then gathers hypothesis evidence (block 421). With respect to QA system instance 420, the context evidence received with the first deepening question is non-local and the gathered hypothesis evidence is local. QA system instance 420 generates one or more candidate answers (block 422) based on the non-local context evidence and the local hypothesis evidence. QA system instance 420 also generates recommended questions (block 423) for deepening information discovery.

QA system instance 430 receives a second deepening question and associated context evidence. QA system instance 430 then gathers hypothesis evidence (block 431). With respect to QA system instance 430, the context evidence received with the second deepening question is non-local and the gathered hypothesis evidence is local. QA system instance 420 generates one or more candidate answers (block 432) based on the non-local context evidence and the local hypothesis evidence. QA system instance 430 also generates recommended questions (block 433) for deepening information discovery.

In the example depicted in FIG. 4, QA system instance 420 generates a third deepening question and attaches a subset of the hypothesis evidence. QA system instance 420 calls the QA system for each deepening question to create QA system instance 440. QA system instance 440 receives a first deepening question and associated context evidence. QA system instance 440 then gathers hypothesis evidence (block 441). With respect to QA system instance 440, the context evidence received with the first deepening question is non-local and the gathered hypothesis evidence is local. QA system instance 440 generates one or more candidate answers (block 442) based on the non-local context evidence and the local hypothesis evidence.

Thus, the illustrative embodiment provides a closure method to access dimensions of evidence without having to provide explicit data pointers. In addition, to account for temporal based dimensions of evidence, the QA system provides a closure-based time weighting that helps to discount or emphasize evidence around a specific time focus that might have been made available from a much later search or even a predictive search. The closure-based dimensions of evidence weighting helps to focus the closure-based evidence around a focus in time.

As the QA system retrieves evidence, the evidence is closed within a container that supports time weighting. Much of the closed evidence may come from questions posed far in the past. In accordance with an illustrative embodiment, a closure-based QA system uses a weighting algorithm to determine one or more points in time to focus on, because the various time frames may be more or less relevant depending on the question being answered. Because each time frame uses a certain amount of closure-based evidence for specific stages within the QA system pipeline interrogating multiple time frames may provide additional results that can then be aggregated for a higher level of accuracy. In an example embodiment, the aggregation technique of all these results may be linear regression and may be leveraged to establish a final weighting value along the time axis.

Figure 5:
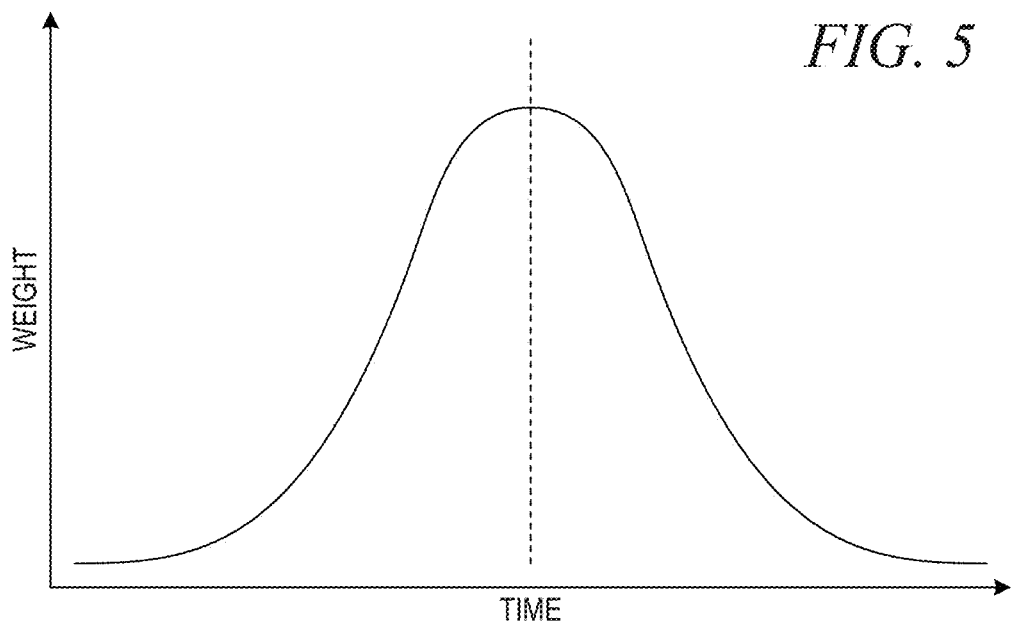
FIG. 5 illustrates an example for a single dimension of evidence; however, for multiple dimensions of evidence, the time weighting component may define a multi-dimensional function.

Thus, in accordance with an illustrative embodiment, a time weighting component defines a time-based weighting function to apply to the evidence to focus results to a given time frame. FIG. 5 illustrates an example of a time-based weighting function in accordance with an illustrative embodiment. In one example, the weighting function is a bell curve, such as a Gaussian function. The Gaussian function is defined by the following equation:

$$f(x) = a \cdot \exp\left(-\frac{(x-b)^2}{2c^2}\right),$$

where a is the height at the curve's peak (1 in an example embodiment), b is the position at the center of the peak (the time focus), and c (the standard deviation) controls the width of the "bell."

In alternative embodiments, the time-based weighting function may be a square pulse or a parabola. Other expressions for time-based weighting functions will become apparent to a person of ordinary skill in the art.

Figure 6:
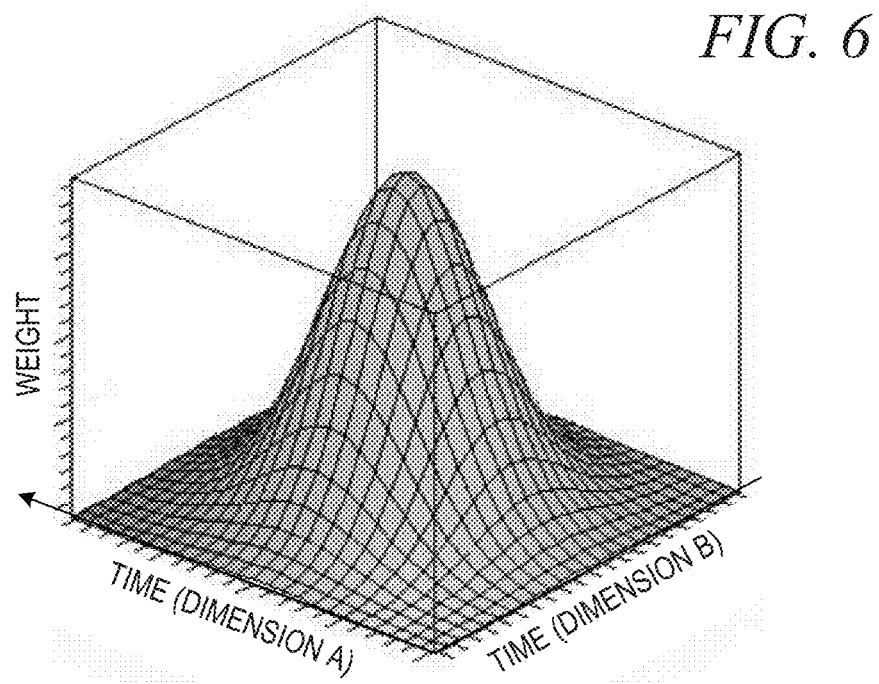
FIG. 6 illustrates a two-dimensional time-based Gaussian weighting function for two dimensions of evidence in accordance with an illustrative embodiment.

FIG. 5 illustrates an example for a single dimension of evidence; however, for multiple dimensions of evidence, the time weighting component may define a multi-dimensional function. FIG. 6 illustrates a two-dimensional time-based Gaussian weighting function for two dimensions of evidence in accordance with an illustrative embodiment.

Figure 7:
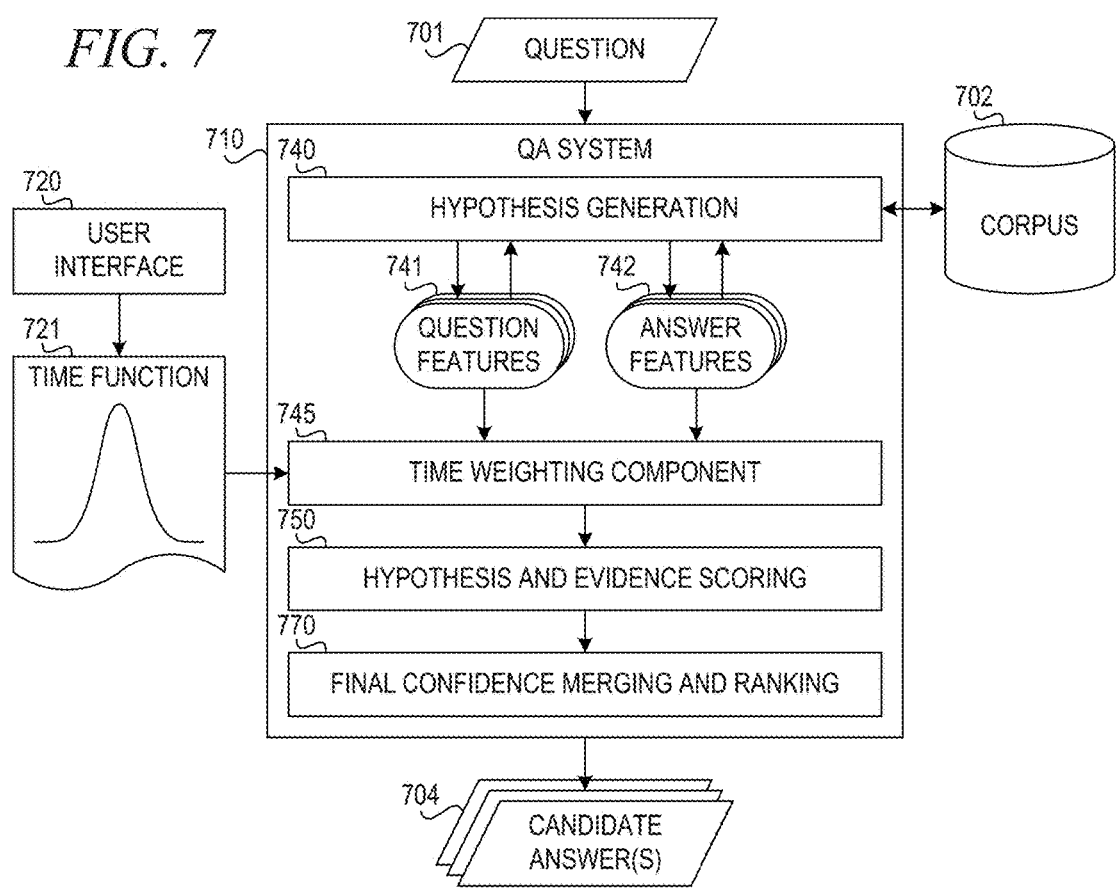
FIG. 7 is a block diagram illustrating a question answering system with time-based weighting in accordance with an illustrative embodiment.

FIG. 7 is a block diagram illustrating a question answering system with time-based weighting in accordance with an illustrative embodiment. Question answering system 710 receives input question 701. Question features 741 are generated by early stages in the QA system pipeline (e.g., question and topic analysis stage 320 and question decomposition stage 330 in FIG. 3). Hypothesis generation phase 740 generates one or more hypotheses for answering input question 701. The one or more hypotheses comprise answer features 742, which include supporting passages from documents in corpus 702 and other annotations and features generated by other stages of the QA system pipeline. In the illustrative embodiment, answer features 742 include time features, such as paper submission date, publication date, creation date, last modified date, archival date, timestamp of retrieval, timestamp of container for dimension of data, etc. The hypothesis generation stage 740 may be similar in scope and function to hypothesis generation stage 340 described above with reference to FIG. 3.

In one embodiment, answer features 742 make up hypothesis evidence for forming one or more hypotheses for answering input question 701. More particularly, answer features 742 may make up both local hypothesis evidence retrieved from corpus 702 and non-local contextual evidence received with question 701.

In accordance with an illustrative embodiment, QA system 710 receives time function 721, which defines a time-based weighting function to apply to answer features 742 making up the hypothesis evidence. In one embodiment, time-based weighting function 721 is a bell curve such that the function at the time focus has the highest value, within the standard deviation of the time focus the function has a relatively high value, and at a time much earlier than or much later than the time focus the function has a very low weight.

In one embodiment, a user defines time-based weighting function 721 using user interface 720. The user may define the function by providing a time focus, and user interface 720 may use a predetermined curve width. In one example embodiment, user interface 720 provides graphical controls for setting time focus and curve width values. For example, user interface 720 may graphically display a timeline and a function shape and provide a first control to allow the user to move the center of the curve along the timeline and a second control to allow the user to change the curve width. User interface 720 then defines time-based weighting function 721 according to value set using user interface 720. In another embodiment, time function 721 is defined using a machine learning algorithm for a particular dimension of evidence, as will be described in further detail below with reference to FIG. 8.

Time weighting component 745 applies time-based weighting function 721 to answer features 742 such that evidence having an associated time value at the time focus is given the highest weight, evidence having an associated date within the standard deviation of the time focus is given a relatively high weight, and evidence having an associated date much earlier than or much later than the time focus is given a very low weight.

Hypothesis and evidence scoring stage 750 then scores the one or more hypotheses and the time-weighted evidence from time weighting component 745. Hypothesis and evidence scoring stage 750 performs a deep analysis and comparison of the language of the input question and the language of each hypothesis or "candidate answer," as well as performs evidence scoring to evaluate the likelihood that the particular hypothesis is a correct answer for the input question. Hypothesis and evidence scoring stage 750 may be similar in scope and function to hypothesis and evidence scoring stage 350 described above with reference to FIG. 3. In an illustrative embodiment, time weighting component 745 comprises one or more reasoning algorithms within the QA system pipeline 300 in FIG. 3. In an example embodiment, time weighting component 745 comprises one or more reasoning algorithms within hypothesis and evidence scoring stage 750.

Final confidence merging and ranking stage 770 compares the confidence scores and measures to each other, compares them against predetermined thresholds, or performs any other analysis on the confidence scores to determine which hypotheses/candidate answers are the most likely to be the correct answer to the input question. Final confidence merging and ranking stage 770 may be similar in scope and function to final confidence merging and ranking stage 370 described above with reference to FIG. 3. Final confidence merging and ranking stage 770 then produces one or more candidate answers 704, which have a high confidence answer to input question 701 and focused to a particular time focus using time-based weighting function 721.

Figure 8:
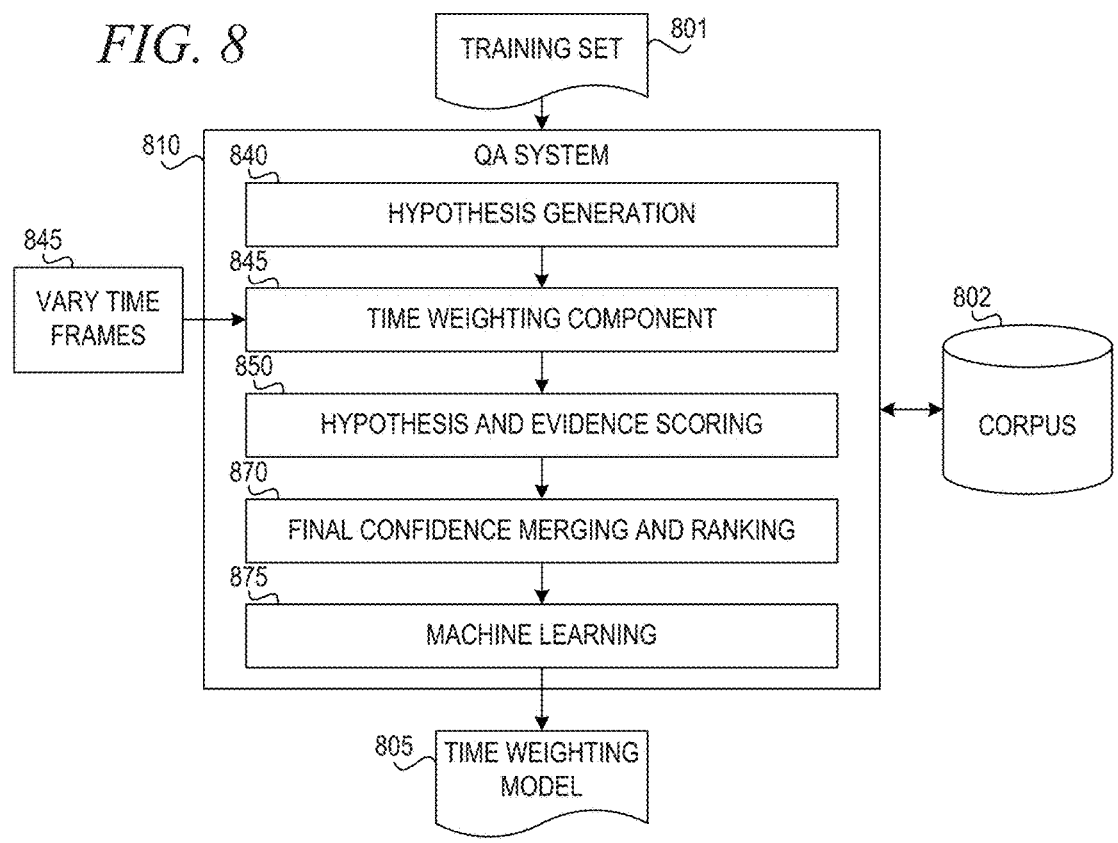
FIG. 8 is a block diagram illustrating a mechanism for training a time weighting machine learning model in accordance with an illustrative embodiment.

FIG. 8 is a block diagram illustrating a mechanism for training a time weighting machine learning model in accordance with an illustrative embodiment. Question answering system 810 receives a set of training data 801, which includes a labeled set of questions and corresponding known answers. Hypothesis generation stage 840 generates one or more hypotheses for answering each question in training set 801. The one or more hypotheses comprise answer features, which include supporting passages from documents in corpus 802 and other annotations and features generated by other stages of the QA system pipeline. In the illustrative embodiment, answer features generated by stage 840 include time features, such as paper submission date, publication date, creation date, last modified date, archival date, timestamp of retrieval, timestamp of container for dimension of data, etc. The hypothesis generation stage 840 may be similar in scope and function to hypothesis generation stage 340 described above with reference to FIG. 3.

Time weighting component 845 applies a time-based weighting function to answer features such that evidence having an associated time value at a given time focus is given the highest weight, evidence having an associated date within the standard deviation of the given time focus is given a relatively high weight, and evidence having an associated date much earlier than or much later than the given time focus is given a very low weight. Component 845 varies time frames for a range of time foci such that time weighting component 845 considers a plurality of different time-based weighting functions.

Hypothesis and evidence scoring stage 850 then scores the one or more hypotheses and the time-weighted evidence from time weighting component 845. Hypothesis and evidence scoring stage 850 performs a deep analysis and comparison of the language of the input question and the language of each hypothesis or "candidate answer," as well as performs evidence scoring to evaluate the likelihood that the particular hypothesis is a correct answer for the input question. Hypothesis and evidence scoring stage 850 may be similar in scope and function to hypothesis and evidence scoring stage 350 described above with reference to FIG. 3. In an illustrative embodiment, time weighting component 845 comprises one or more reasoning algorithms within the QA system pipeline 300 in FIG. 3. In an example embodiment, time weighting component 845 comprises one or more reasoning algorithms within hypothesis and evidence scoring stage 850.

Final confidence merging and ranking stage 870 compares the confidence scores and measures to each other, compares them against predetermined thresholds, or performs any other analysis on the confidence scores to determine which hypotheses/candidate answers are the most likely to be the correct answer to the input question. Final confidence merging and ranking stage 870 may be similar in scope and function to final confidence merging and ranking stage 370 described above with reference to FIG. 3.

Machine learning component 875 trains time weighting model 805 based on results of generating answers using training set 801 and various time-based weighting functions by component 845 varying time frames. Thus, machine learning component 875 generates time weighting model 805, which can be used to adjust values for evidence and scoring to achieve the correct results based on the actual results from training set 801 and ground truth (correct and incorrect answer instances) in labeled training set 801.

In one embodiment, machine learning component 875 uses a logistic regression to train time weighting model 805. Logistic regression produces a score between 0 and 1 according to the following formula:

$$f(x) = \frac{1}{1 + e^{-\beta_0 - \sum_{m=1}^{M} \beta_m x_m}},$$

where m ranges over the M features for instance x and $\beta_0$ is the "intercept" or "bias" term. An instance x is a vector of numerical feature values, corresponding to one single occurrence of whatever the logistic regression is intended to classify. Output f(x) is used like a probability, and learned parameters $\beta_m$ are interpreted as "weights" gauging the contribution of each feature. For example, a logistic regression to classify carrots as edible or inedible would have one instance per carrot, and each instance would list numerical features such as the thickness and age of that carrot. The training data consist of many such instances along with labels indicating the correct f(x) value for each (e.g., 1 for edible and 0 for inedible carrots). The learning system computes the model (the β vector) that provides the best fit between f(x) and the labels in the training data. That model, the authority model in the illustrative embodiments, is then used on test data to classify instances.

In one embodiment, machine learning component 875 determines one or more time-based weighting functions, or more simply time foci, to achieve the most accurate results. Machine learning component 875 then generates time weighting model 805 with the appropriate values to use the best time-based weighting function for each given input question and set of hypothesis evidence. In an example embodiment, time weighting model 805 stores a value or function for determining a time focus for each given dimension of evidence. Returning to FIG. 7, given time weighting model 805, question features 741, and answer features 742, a component, such as time weighting component 745, can define time-based weighting function 721.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
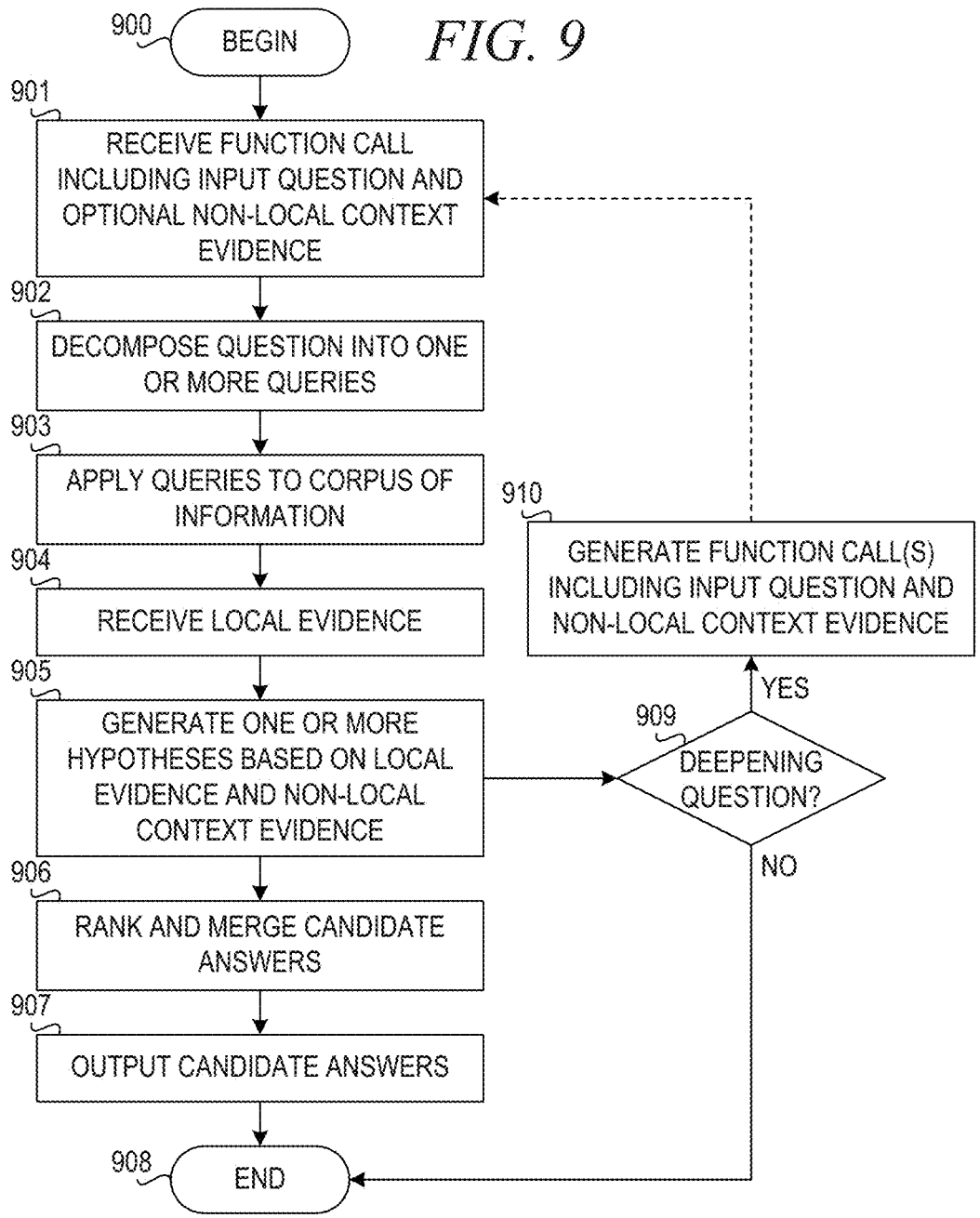
FIG. 9 is a flowchart illustrating operation of a mechanism for iterative deepening knowledge discovery using closure-based question answering in accordance with an illustrative embodiment.

FIG. 9 is a flowchart illustrating operation of a mechanism for iterative deepening knowledge discovery using closure-based question answering in accordance with an illustrative embodiment. Operation begins (block 900), and the mechanism receives a function call including an input question and optional non-local context evidence (block 901). An initial input question may have no associated context evidence; however, in one example embodiment, an initial input question may have attached some designated context evidence, such as user profile information, evidence stored from a previous session, evidence from a last question asked, etc. Each subsequent question will include a set of non-local context evidence from which the question was derived.

The mechanism decomposes the question into one or more queries (block 902), applies the queries to the corpus of information (block 903), and receives local hypothesis evidence from the corpus (block 904). The mechanism then generates one or more hypotheses based on local evidence and non-local context evidence (block 905). The mechanism ranks and merges the candidate answers (block 906) and outputs the candidate answers (block 907). Thereafter, operation ends for the current instance of the QA system (block 908).

Also, from block 905, the mechanism determines whether to generate deepening questions from the local evidence (block 909). If the mechanism determines not to generate deepening questions, operation ends (block 908). If the mechanism determines to generate deepening questions in block 909, the mechanism generates a function call for each generated deepening question including the question and non-local context evidence (block 910). Thereafter, operation proceeds to block 901 where the function call(s) are received by the mechanism to generate another QA system instance.

As described above, the mechanism uses slot filler templates to generate deepening questions. Each slot has a specific part of speech and label. The mechanism inserts the words of the supporting passages of the hypothesis evidence into the slot filler templates to form the deepening questions.

Thus, the mechanism allows each QA system function instance to generate further instances. As a result, the mechanism performs iterative, deepening knowledge discovery by asking further questions based on hypothesis evidence. The mechanism may have an inherent limit to the depth of the knowledge discovery.

Figure 10:
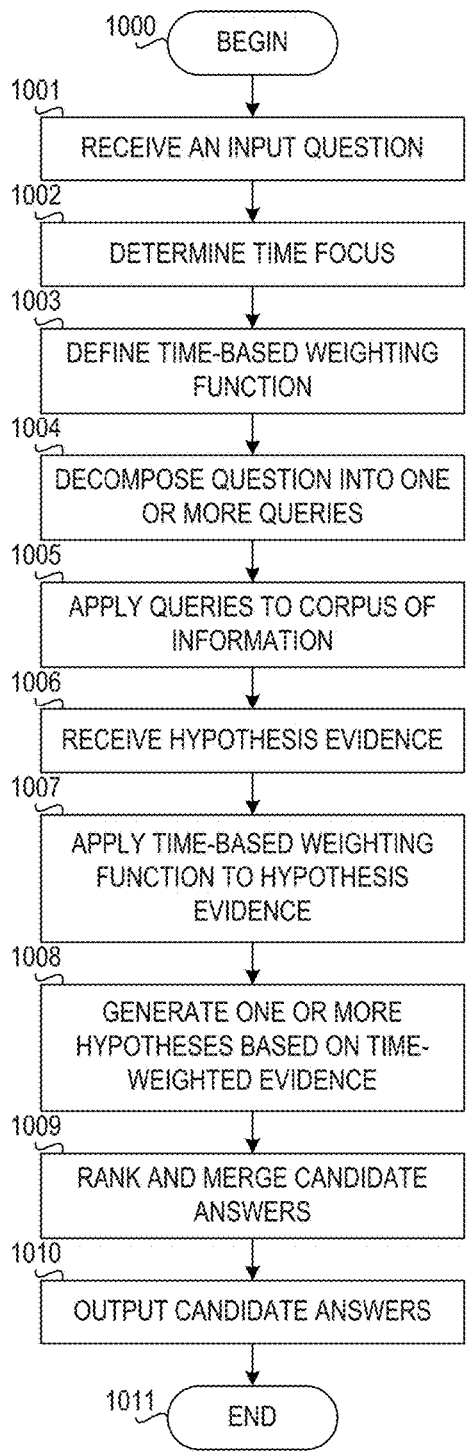
FIG. 10 is a flowchart illustrating operation of a mechanism for answering questions with time-based weighting in accordance with an illustrative embodiment.

FIG. 10 is a flowchart illustrating operation of a mechanism for answering questions with time-based weighting in accordance with an illustrative embodiment. Operation begins (block 1000), and the mechanism receives an input question (block 1001). The mechanism determines a time focus (block 1002) and defines a time-based weighting function based on the time focus (block 1003).

The mechanism decomposes the question into one or more queries (block 1004), applies queries to the corpus of information (block 1005), and receives hypothesis evidence (block 1006). The mechanism then applies the time-weighting function to the hypothesis evidence (block 1007). The mechanism generates one or more hypotheses for candidate answers to answer the input question based on the time-weighted evidence (block 1008). The mechanism then ranks and merges the candidate answers (block 1009) and outputs the candidate answers (block 1010). Thereafter, operation ends (block 1011).

Figure 11:
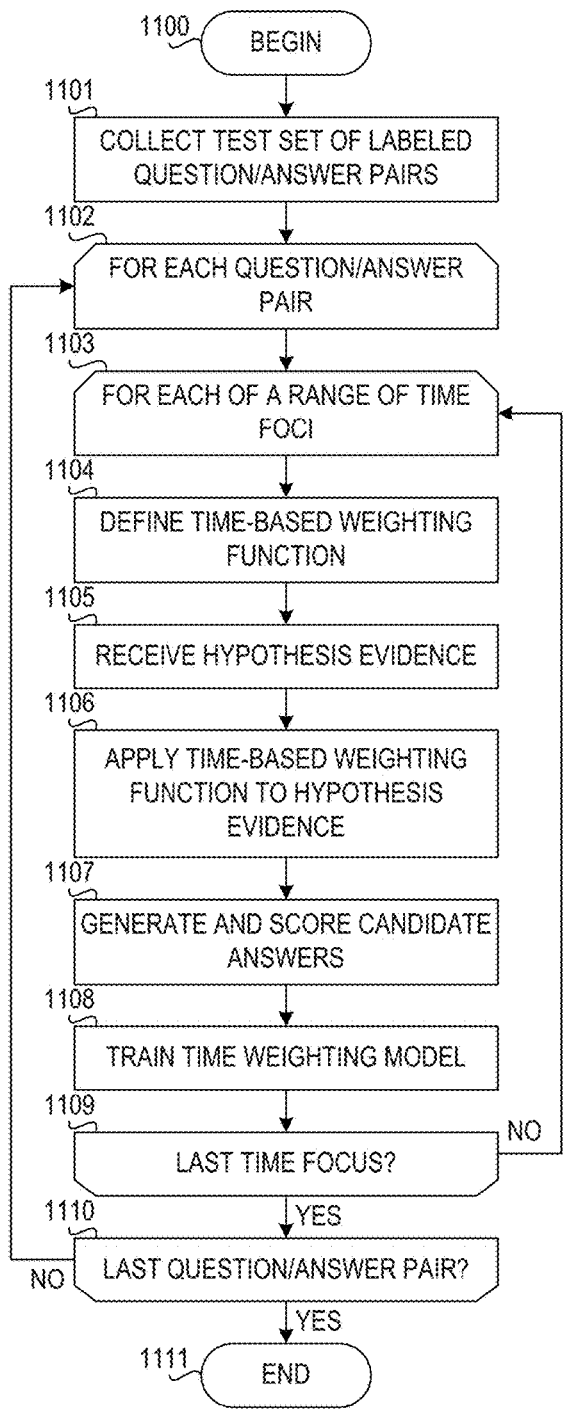
FIG. 11 is a flowchart illustrating operation of a mechanism for training a time weighting machine learning model in accordance with an illustrative embodiment.

FIG. 11 is a flowchart illustrating operation of a mechanism for training a time weighting machine learning model in accordance with an illustrative embodiment. Operation begins (block 1100), and the mechanism collects a test set of labeled question/answer pairs (block 1101). For each question/answer pair (block 1102) and for each of a range of time foci (block 1103), the mechanism defines a time-based weighting function (block 1104). The mechanism receives hypothesis evidence for the question (block 1105) and applies the time-based weighting function to the hypothesis evidence (block 1106). The mechanism then generates and scores candidate answers (block 1107). The mechanism trains a time weighting model (block 1108).

The mechanism determines whether the time focus is the last focus in the range of time foci (block 1109). If the time focus is not the last time focus, operation returns to block 1103 to consider the next time focus. If the time focus is the last time focus in block 1109, the mechanism determines whether the question/answer pair is the last question/answer pair in the test set (block 1110). If the question/answer pair is not the last question/answer pair, operation returns to block 1102 to consider the next question/answer pair. If the question/answer pair is the last question/answer pair in the test set in block 1110, then operation ends (block 1111).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one memory and at least one processor, for question answering using time weighted evidence, the method comprising:

configuring the at least one memory with instructions, which are executed by the at least one processor and configure the at least one processor to implement a question answering system;

receiving, by the question answering system, an input question from a user;

receiving, by the question answering system from the user via a user interface, a first time focus for the input question and a curve width, wherein the user interface graphically displays a timeline and a function shape and provides a first control to allow the user to move a center of the function shape along the timeline and a second control to allow the user to change the curve width;

determining a second time focus for a second dimension of evidence;

defining, by a time weighting component executing within the question answering system, a weighting function, wherein the weighting function is a multidimensional Gaussian function having a first time axis corresponding to the first dimension of evidence and a second time axis corresponding to the second dimension of evidence and having the peak at an intersection of the first time focus on the first time axis and the second time focus on the second time axis;

decomposing, by a question decomposition component executing within the question answering system, the input question into one or more queries;

applying, by a hypothesis generation component executing within the question answering system, the one or more queries to a corpus of information to obtain a set of hypothesis evidence, wherein each item of information within the hypothesis evidence has an associated time value;

weighting, by the time weighting component, the set of hypothesis evidence based on the associated time values according to the weighting function to font t time weighted evidence;

scoring, by a hypothesis and evidence scoring component executing within the question answering system, a plurality of hypotheses for answering the input question based on the time weighted evidence;

ranking, by a final confidence merging and ranking component executing within the question answering system, the plurality of hypotheses to form a ranked set of candidate answers to the input question; and outputting, by the question answering system, the ranked set of candidate answers to the user.

2. The method of claim 1, further comprising determining a standard deviation of the multi-dimensional Gaussian function based on user input.

3. The method of claim 1, wherein the associated time value comprises a paper submission date, a publication date, a creation date, a last modified date, or an archival date.

4. The method of claim 1, wherein the associated time value comprises a timestamp of retrieval or a timestamp of a container for a dimension of evidence.

5. A computer program product comprising a computer readable storage medium having a computer readable program stored therein, wherein the computer readable program, when executed on a computing device, causes the computing device to implement a question answering system, wherein the computer readable program causes the computing device to:
  receive, by the question answering system, an input question from a user;
  receive, by the question answering system from the user via a user interface, a first time focus for the input question and a curve width, wherein the user interface graphically displays a timeline and a function shape and provides a first control to allow the user to move a center of the function shape along the timeline and a second control to allow the user to change the curve width;
  determine a second time focus for a second dimension of evidence;
  define, by a time weighting component executing within the question answering system, a weighting function, wherein the weighting function is a multi-dimensional Gaussian function having a first time axis corresponding to the first dimension of evidence and a second time axis corresponding to the second dimension of evidence and having the peak at an intersection of the first time focus on the first time axis and the second time focus on the second time axis;
  decompose, by a question decomposition component executing within the question answering system, the input question into one or more queries;
  apply, by a hypothesis generation component executing within the question answering system, the one or more queries to a corpus of information to obtain a set of hypothesis evidence, wherein each item of information within the hypothesis evidence has an associated time value;
  weight, by the time weighting component, the set of hypothesis evidence based on the associated time values according to the weighting function to form time weighted evidence;
  score, by a hypothesis and evidence scoring component executing within the question answering system, a plurality of hypotheses for answering the input question based on the time weighted evidence;
  rank, by a final confidence merging and ranking component executing within the question answering system, the plurality of hypotheses to form a ranked set of candidate answers to the input question; and
  output, by the question answering system, the ranked set of candidate answers to the user.

6. The computer program product of claim 5, wherein the computer readable program further causes the computing device to determine a standard deviation of the multi-dimensional Gaussian function based on user input.

7. The computer program product of claim 5, wherein the associated time value comprises a paper submission date, a publication date, a creation date, a last modified date, or an archival date.

8. The computer program product of claim 5, wherein the associated time value comprises a timestamp of retrieval or a container for a dimension of evidence.

9. An apparatus comprising:
  a processor; and
  a memory coupled to the processor, wherein the memory comprises instructions which, when executed by the processor, cause the processor to implement a question answering system, wherein the instructions causes the processor to:
  receive, by the question answering system, an input question;
  receive, by the question answering system via a user interface, a first time focus for the input question and a curve width, wherein the user interface graphically displays a timeline and a function shape and provides a first control to allow the user to move a center of the function shape along the timeline and a second control to allow the user to change the curve width;
  determine a second time focus for a second dimension of evidence;
  define, by a time weighting component executing within the question answering system, a weighting function, wherein the weighting function is a multi-dimensional Gaussian function having a first time axis corresponding to the first dimension of evidence and a second time axis corresponding to the second dimension of evidence and having the peak at an intersection of the first time focus on the first time axis and the second time focus on the second time axis;
  decompose, by a question decomposition component executing within the question answering system, the input question into one or more queries;
  apply, by a hypothesis generation component executing within the question answering system, the one or more queries to a corpus of information to obtain a set of hypothesis evidence, wherein each item of information within the hypothesis evidence has an associated time value;
  weight, by the time weighting component, the set of hypothesis evidence based on the associated time values according to the weighting function to form time weighted evidence;
  score, by a hypothesis and evidence scoring component executing within the question answering system, a plurality of hypotheses for answering the input question based on the time weighted evidence;
  ranking, by a final confidence merging and ranking component executing within the question answering system, the plurality of hypotheses to form a ranked set of candidate answers to the input question; and
  outputting, by the question answering system, the ranked set of candidate answers to the user.

10. The apparatus of claim 9, wherein the associated time value comprises a paper submission date, a publication date, a creation date, a last modified date, or an archival date.

11. The apparatus of claim 9, wherein the associated time value comprises a timestamp of retrieval or a timestamp of a container for a dimension of evidence.

* * * * *